United States Patent [19]
Riley

[11] Patent Number: 5,146,267
[45] Date of Patent: Sep. 8, 1992

[54] REFLECTANCE BASED MICROFILMING PROCESS

[75] Inventor: Michael H. Riley, Hellertown, Pa.

[73] Assignee: OCLC Online Computer Library Center, Incorporated, Dublin, Ohio

[21] Appl. No.: 792,599

[22] Filed: Nov. 15, 1991

[51] Int. Cl.$^5$ ...................... G03B 27/74; G03B 27/80
[52] U.S. Cl. ......................................... 355/68; 355/77
[58] Field of Search ...................... 355/38, 68, 77, 64, 355/308, 311; 358/76, 80

[56] References Cited
U.S. PATENT DOCUMENTS

3,563,143  2/1971  Peterson ........................... 355/68 X
4,433,908  2/1984  Omi et al. ............................. 355/68

Primary Examiner—L. T. Hix
Assistant Examiner—D. Rutledge
Attorney, Agent, or Firm—Mueller and Smith

[57] ABSTRACT

A process is described for preservation microfilming in which variations in the "fade" or background coloration of materials to be recorded is accommodated for. In particular, the process initially develops a characteristic of the camera based workstation itself which relates an exposure meter output with a select sequence of variations of the light source used with the workstation. A pseudo background target of constant hue such as a beige color is used for this purpose. A sample card also is utilized which carries a sequence of color samples each generally within a pertinent range of the spectra associated with the general coloration of the work to be recorded. Reflectance densitometer readings are taken for each of the samples on this card and the card, itself, is recorded on microfilm. The images of the samples on that test microfilm then are evaluated utilizing a transmittance densitometer. The resultant data then are compiled in a program which permits exposure to be set by the operator based upon a reflectance densitometer reading of the background of the materials being filmed. Thus, as the tone or hue of these materials alter during the course of microfilming, the operator may re-evaluate background hue with the reflectance densitometer and adjust exposure accordingly on a substantially objective basis.

19 Claims, 8 Drawing Sheets

| SAMPLE REFLECTANCE READINGS |||| 
|---|---|---|---|
| REG. FADES || BLUE FADES ||
| SAMP. # | READING | SAMP. # | READING |
| 1 | 8 | 11 | 13 |
| 2 | 2 | 12 | 6 |
| WHITE | 1 | WHITE | 1 |
| 4 | 46 | 14 | 34 |
| 5 | 31 | 15 | 21 |
| 6 | 20 | 16 | 32 |
| 7 | 47 | 17 | 18 |
| 8 | 36 | RED FADES ||
| 9 | 24 | SAMP. # | READING |
| 10 | 12 | 1P | |
| | | 2T | |
| | | 3D | |
| | | 4D | |
| | | 5A | |

CAMERA #11    TOP OF GLASS    DATE    (ADJUSTED FOR BALANCE)

| VOLTS SAMPLE # | 70 | 74 | 78 | 82 | 86 | 90 | 94 | 98 | 102 | 106 | 110 | 114 | 118 | 122 |
|---|---|---|---|---|---|---|---|---|---|---|---|---|---|---|
| REG.FADES | | | | | | | | | | | | | | |
| 1 | | | | | | | | | | | | | | |
| 2 | | | | | | | | 102 | | | | | | |
| WHITE | | | | | | | 101 | 122 | | | | | | |
| 4 | | | | | | | 102 | 123 | | | | | 92 | |
| 5 | | | | | | | | | | | 98 | 117 | | |
| 6 | | | | | | | | | | 116 | | | 92 | 111 |
| 7 | | | | | | | | | 96 | | | | | |
| 8 | | | | | | | | | | | | 101 | 120 | 110 |
| 9 | | | | | | | | | | | 102 | 119 | | |
| 10 | | | | | | | | 93 | 112 | | | | | |
| BLUES | | | | | | | | | | | | | | |
| 11 | | | | | | | | | | | | | | |
| 12 | | | | | | | | | | | | | | |
| WHITE | | | | | | | | | | | | | | |
| 14 | | | | | | | | | | | | | | |
| 15 | | | | | | | | | | | | | | |
| 16 | | | | | | | | | | | | | | |
| 17 | | | | | | | | | | | | | | |
| REDS | | | | | | | | | | | | | | |
| 18 | | | | | | | | | | | | | | |
| — | | | | | | | | | | | | | | |
| 30 | | | | | | | | | | | | | | |

EXPOSURE SETTINGS
CAM #11
12x REGULAR FADES - ON TOP OF GLASS
(ADJUSTED FOR BALANCE)

DATE

| REFLEX READING | EXPOSURE SETTING | REFLEX READING | EXPOSURE SETTING | REFLEX READING | EXPOSURE SETTING |
|---|---|---|---|---|---|
| 1 | -6 | 16 | 2 | 31 | 5.5 |
| 2 | -6 | 17 | -1.5 | 32 | 6 |
| 3 | -5.5 | 18 | -1 | 33 | 6.5 |
| 4 | -5.5 | 19 | -0.5 | 34 | 7 |
| 5 | -5 | 20 | 0 | 35 | 8 |
| 6 | -5 | 21 | 0.5 | 36 | 8.5 |
| 7 | -5 | 22 | 1 | 37 | 9.5 |
| 8 | -4.5 | 23 | 1.5 | 38 | 10 |
| 9 | -4.5 | 24 | 2 | 39 | 11 |
| 10 | -4 | 25 | 2.5 | 40 | 11.5 |
| 11 | -4 | 26 | 3 | 41 | 12.5 |
| 12 | -3.5 | 27 | 3 | 42 | 13.5 |
| 13 | -3 | 28 | 3.5 | 43 | 14 |
| 14 | -3 | 29 | 4 | 44 | 14.5 |
| 15 | 2.5 | 30 | 5 | 45 | 15 |

REFLECTANCE BASED MICROFILMING PROCESS

BACKGROUND OF THE INVENTION

Microfilm camera operators engaged, for example, in preservation recordation of materials, traditionally have been required to subjectively evaluate the exposure requirements for the multiple pages of such works and adjust their equipment accordingly. Although the filming environment is more stable for microfilming than is common in general photography, efforts in the former endeavor must be undertaken under rigid standards, for example those established by the Research Library Group (RLG). These standards require that the background in the final product image exhibit a uniform "density" within a very tight range tolerance. To achieve that requisite consistency, variations in the light and color characteristics of the subject material e.g. "fading" or yellowing or browning of paper by oxidation must be compensated for. Even small, subjectively imperceptible variations become significant, the darker pages near the beginning or end of a decaying book requiring different exposure than needed for the lighter pages near the middle. Where exposure evaluation fails, the work must be repeated and acceptable replacement frames spliced into a film reel. The noted standards limit the permissible number of such splicings per reel. Thus, the filming of an entire reel of 600 to 1200 frames may be required to be repeated should the operator's evaluation of correct exposure fail excessively.

A typical microfilming production station is somewhat basic. The camera head is movably supported upon a column extending above a work surface. Conventionally, four photographic flood lamps are mounted adjacent to and above the work surface. The luminal output of these lamps is controlled by a rheostat mounted with the assembly such that the light value therefrom is regulated in terms of volts. While the exposure setting can be established by conventional shutter speed-aperture adjustment, the photographic parameter adjustment for the system conventionally is provided by simply setting the "volts" indicator on the rheostat or at an associated voltmeter in conjunction with the provision of fixed values for shutter speed and aperture. The assembly also will include a conventional exposure meter typically mounted adjacent the supporting column and arranged to view and respond to an averaged or integrated value for reflective brightness at the subject plane or filming position. That plane typically will provide for positioning the work to be photographed such as a page or paired adjacent pages of an open book beneath a glass cover. Generally, an operator will film as many as 250 frames in an hour during a typical work day.

The exposure meters employed with microfilming stations generally are inadequate for the purpose of achieving proper exposure adjustment. Variations in the print content and style on a given page to be filmed will cause error in reflectance evaluations otherwise made by the meters. Thus, a conventional approach to determining correct exposure settings has been to carry out a process of test filming of the subject material under different exposure settings. The resultant film then is developed and, the test images are evaluated, e.g. using a transmittance densitometer to determine which light or exposure parameter setting is appropriate. Once that setting is determined, it becomes the task of the operator to evaluate "fade" or background reflectance changes, for example, as the pages of a book are turned from the beginning of the book towards the middle and from the middle of the book towards its end. Often eye fatigue and the like enters to lend confusion to this personal and subjective evaluation. Such test filming approaches are slow and costly, error prone and inflexible. Further, the testing must be repeated when the subject material changes, when the camera set-up changes, as by lamp replacement, and when work is moved from one camera or camera operator to another. Cameras and their support equipment exhibit subtle variations from one station to another (e.g. shutter, lens and lamp characteristics) and ambient light conditions often vary among work stations. Thus, the exposure settings for one work station have no validity for another.

One normalizing approach to the test filming procedure has been to employ a pseudo background which may be provided, for example, as a card having a hue such as a beige color serving to somewhat emulate a conventionally aged page of material. With this approach, exposure meter settings were established using a beige card at the target position for the camera. The card was then removed and a test filming of the subject work was then made at a light voltage setting adjusted in correspondence with the earlier determined exposure meter setting. This procedure was carried out over a sequence of exposure increments and the resultant film images then were evaluated using a noted transmittance densitometer approach.

SUMMARY

The present invention is addressed to a process for the microfilm recording of materials which may exhibit variations in background fade (light and color characteristics) or hue. The procedure provides a unified sequence of steps for obtaining exposure settings which will be valid for a given camera/workstation for any type of material filmed. Exposure control is based upon a measurement of background or fade using a reflectance densitometer. Once an initial set-up of a workstation is carried out under the procedure, the subject matter filmed may be changed at will, either a new "job" may be undertaken, or a given job transfer to a different camera/workstation. Variations in fade or background can be compensated for periodically or otherwise on a frame-by-frame basis through resort to a simple reflectance reading of a background portion of the material. Thus, the demands of a subjective evaluation on the part of the operator are significantly reduced. With the process, less time is spent in set-up activities at a workstation to commence filming procedures. The more objectively controlled performance of the operator results in lower retake rates and there is exhibited a greater flexibility for scheduling work due to an ability to transfer a given job among different workstations. Additionally, the training requirements otherwise required to operators are lessened since the performance of the operator is less sensitive to subjective skills and judgment.

Another feature of the invention is to provide a process for recording the image on film of a sheet carrying characters on a background exhibiting a given hue. The process employs a camera arrangement having a filming position at which the sheet is located for filming, an exposure meter having an output corresponding with light reflectance at the filming position, and at least one variable exposure control parameter including light from a light source directing spectral illumination output at the filming position, the process comprising the steps of:

provided a pseudo background target having a select uniform hue;

positioning the pseudo background target at the filming position and varying the illumination output by a predetermined sequence of light values;

simultaneously deriving the exposure meter output for each one of the light values and providing a characteristic relationship of each derived meter output with the light values;

removing the pseudo background target from the filming position;

providing a test assemblage of a plurality of discrete test regions, each exhibiting a predetermined different hue;

determining a reflectance value for each discrete test region;

positioning the assemblage at the filming position;

filming the assemblage with a test sequence of exposures corresponding with the predetermined sequence of light values to derive test film carrying a sequence of images of the assemblage;

deriving the density values of each image of the test regions on the test film;

correlating the density values with respect to a target density value, the predetermined sequence of light values and the predetermined reflectance values to derive a calculated light value corresponding with each one of a predetermined regular sequence of reflectance values;

deriving an exposure setting compilation as an exposure meter output for each reflection value of the predetermined regular sequence thereof from the characteristic relationship;

determining the reflectance value of the sheet background; and photographing the sheet employing an exposure control parameter representing an exposure setting of the compilation substantially corresponding with the determined reflectance value of the sheet background.

Another feature of the invention provides a process for recording the image on microfilm of a sheet carrying characters on a background region, the process employing a workstation including a camera, a filming position at which the sheet is located for filming, and the camera being actuable in accordance with a controlled exposure parameter to effect generation of the image, comprising the steps of:

providing a pseudo background target having a select uniform hue;

locating the pseudo background target at the filming position and deriving an exposure response characteristic sequence of values of the exposure parameter;

providing a sample card carrying a plurality of background samples of select, mutually different hue;

determining the reflectance density value of each background sample;

locating the sample card at the filming position;

producing test recordations of the sample card on microfilm with a camera using the sequence of values of the exposure parameter;

deriving transmission density values for the images of the background samples of test recordations with respect to the sequence of values of the exposure parameter;

correlating the transmission density values with respect to a target density value, the sequence of values of exposure parameter and the determined reflectance density values to derive a calculated exposure parameter corresponding with each one of a predetermined regular sequence of reflectance density values;

determining the reflectance density value of the sheet background region; and photographically recording the sheet on microfilm with the camera at a value of exposure parameter from the characteristic sequence selected with respect to a calculated exposure parameter corresponding with the determined reflectance value.

Still another feature and object is to provide a process for recording the image on microfilm of a sheet having a background region of given hue, the process employing a workstation including a camera, a filming position at which the sheet is located for photographing by the camera, an exposure meter having outputs corresponding to light values at the filming position, and a variable light source directing select illumination at the filming position in accordance with light input values, comprising the steps of:

providing a pseudo background target having a consistent hue selected in correspondence with the sheet background region of given hue;

locating the pseudo background target at the filming position and incrementally varying the light input values in a predetermined sequence;

simultaneously recording the exposure meter outputs for each one of the light input values and deriving a characteristic relationship of the recorded exposure meter outputs with the light input values;

removing the pseudo background target from the filming position;

providing a sample card carrying a plurality of background samples of select, mutually different hue;

determining the reflectance density value of each of the background samples;

producing test recordations of the sample card on microfilm with the camera using the predetermined sequence of light input values as a variable exposure parameter;

deriving transmission density values of the images of the background samples of the test recordation with respect to the predetermined sequence of light input values;

correlating the transmission density values with respect to a target transmission density value, the sequence of light input values and the determined reflectance density values to derive a calculated light output value corresponding with each one of a predetermined regular sequence of reflectance density values;

determining the reflectance density value of the sheet background region;

recording the image of the sheet on microfilm using a light output value derived with respect to an exposure meter output selected in correspondence with a calculated light output value, the calculated light output value, in turn, corresponding with a predetermined reflectance density value equivalent to the determined reflectance density value of the sheet background region.

For a fuller understanding of the nature and objects of the invention, reference should be had to the following detailed description taken in connection with the accompanying drawings.

Other objects of the invention will, in part, be obvious and will, in part, appear hereinafter. The invention, accordingly, comprises the method possessing the steps which are exemplified in the following detailed disclosure. For a fuller understanding of the nature and objects of the invention, reference should be had to the following detailed description taken in connection with the accompanying drawings.

DETAILED DESCRIPTION OF THE INVENTION

Figure 1:
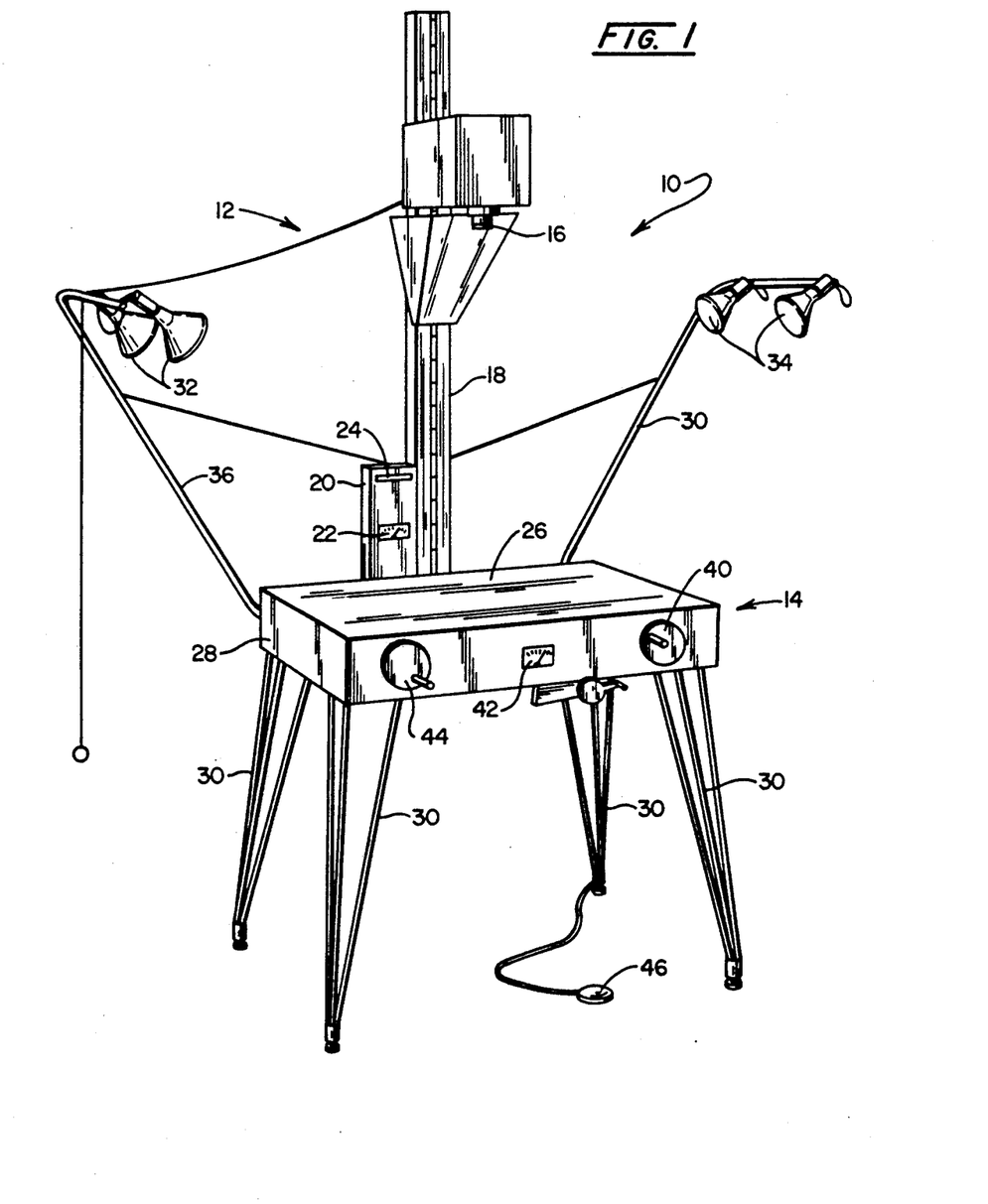
FIG. 1 is a perspective view of a workstation wherein the process of the invention may be employed.

Microfilming stations are somewhat consistent in structure. A typical microfilming work station is represented in FIG. 1 in general at 10 and is seen to include a head portion 12 and copy body components 14. The head portion 12 includes a microfilming camera 16 having a lens, aperture, and shutter. For the instant embodiment, the shutter and aperture represent fixed exposure parameters. Camera 16 is seen mounted on a rigid column 18 and is movable vertically thereon to provide for different reduction ratios. Generally, for typically encountered page sizes, a 12:1 reduction ratio is established. Adjacent to the column 18 is an exposure meter 20 having a readout 22 and window 24. Window 24 as well as the lens of camera 16 surveys a subject plane or filming position represented as the top 26 of a table defining cabinet 28. Cabinet 28 is seen supported upon hairpin legs 30. The output 22 of exposure meter 20 provides an average or somewhat integrated evaluation of light reflectance at the subject plane 26 in arbitrary units, for example ranging from values of +20 to -20.

Illuminating the subject plane 26 are paired flood lamps 32 and 34 supported upon respective brackets 36 and 38. The luminal output of lamps 32 and 34 is controlled by manually actuated rheostat, the control knob of which is shown at 40 and the voltage output of which may be determined by a voltmeter mounted in cabinet 28 at 42. On the opposite side of the cabinet 28 there is provide a copy level control knob 44. Additionally, such components as a light switch and locking knob are provided with the controls for cabinet 28. Actuation of the shutter of camera 16 is by a foot switch shown at 46. Not shown in FIG. 1 are the components for retaining the material to be filmed, the sheet materials or text may be maintained under a sheet of glass to accurately locate them along a predetermined subject plane. The utilization of such glass sheet also nominalizes any reflectance effects occasioned by the relative texture or light scattering effects of the material being photographed.

Figure 2:
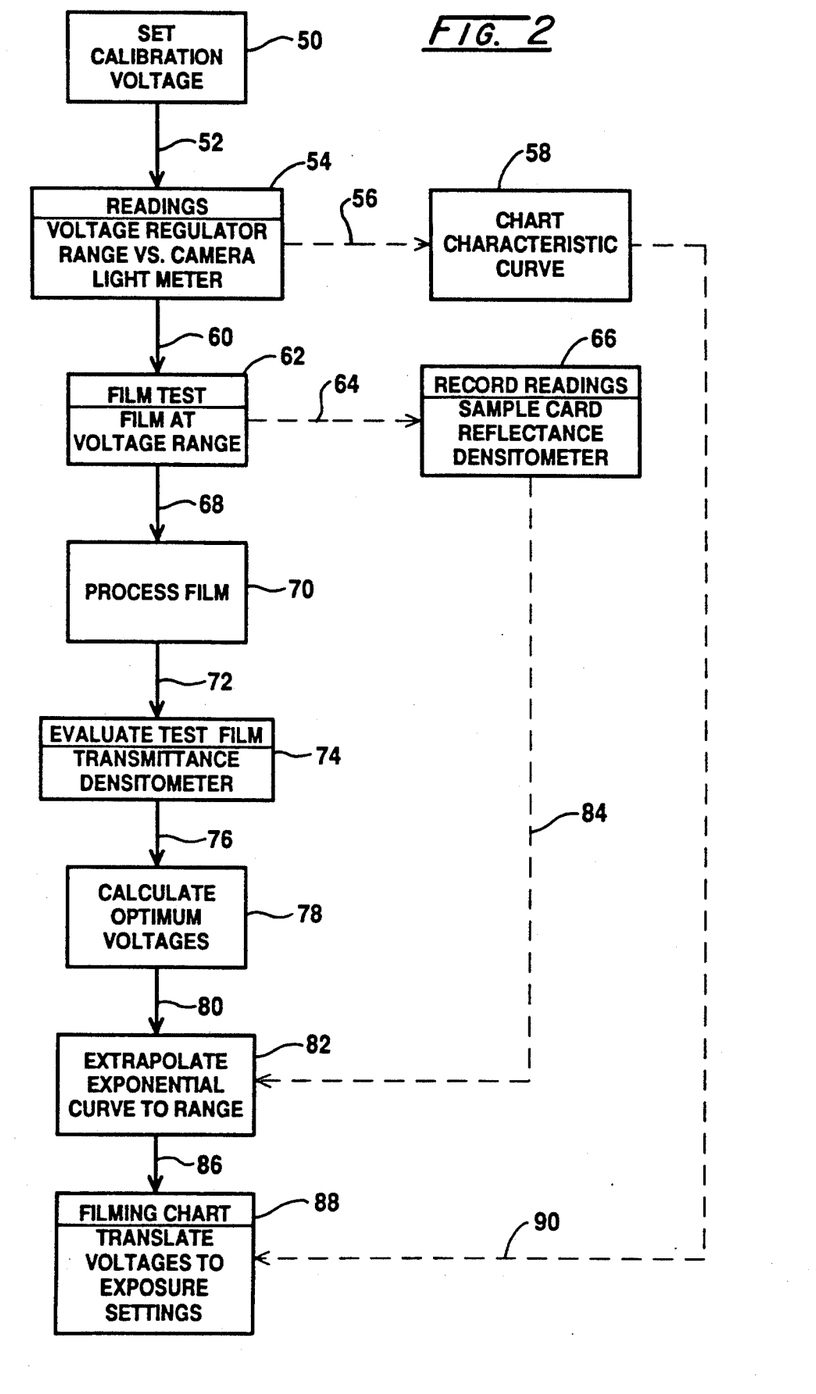
FIG. 2 is a flow chart showing generally the procedure of the invention.

Referring to FIG. 2, a general schematic block diagrammatic representation of the instant procedure is provided. The procedure includes an initial step conventional to all microfilming stations of calibrating the equipment. In general, calibration is carried out in conjunction with a technical target or resolution chart formed of line pairs and white and black squares and the like. The resolution chart or target is positioned at the filming position 26 and a sequence of exposures are taken of it representing a regular incrementation of light voltage values, for example, established by the rheostat 40 as evidenced at voltmeter output 42. The film is then developed and the most optimum image determined, for example, utilizing a transmission or transmittance densitometer. At the commencement of any given reel of film, the resolution chart or target is again located at the filming position 26, the light setting is adjusted by knob 40 to the optimum setting determined by the transmittance densitometer, and the exposure meter 20 is adjusted so that its readout at 22 is at a zero or mid-range value. That concludes the calibration procedure. A transmittance densitometer, in general is an optical densitometer which mesures a transmittance factor or density. the transmittance factor is a measure of how much light can pass through a sample. It is defined as the ratio of the measured flux transmitted by the specimen to the measured flux when the specimen is removed from the sampling aperture. Standards for measuring transmittance factor are established in ANSI/ISO 5/2-1985, ANSI PH2.19-1986. To measure the transmittance factor light is shined perpendicularly onto one side of the sample and the intensity of light passing directly through it is measured (again, ANSI standards specify the exact geometry).

Following calibration, as represented by line 52 and block 54, a characteristic relationship for the camera or workstation at hand is derived. This characteristic is one relating the output of the exposure meter 20 at window 22 with light values generated by the lighting system including lamps 32 and 34 in conjunction with a somewhat regularly stepped incrementation of luminance. To achieve a desired consistency with the procedure, a pseudo background target is utilized, for example, being provided as a beige colored card corresponding with the regular fades or hues encountered in preservation microfilming and the like. The pseudo target is plain in that it has no print or the line on it but exhbits a continuous or regular hue and the consistency of readout for the exposure meter is thus improved.

Because the light meter 20 itself is utilized ultimately by the operator for the present arrangement in establishing exposure, the photographic parameter which is varied is the output of the light sources 32 and 34. This output is varied incrementally by maneuvering the rheostat knob 40 and observing the voltmeter output 42. For example, the voltage observed at meter 42 may be advanced from 70 volts in four volt increments up to 124 volts. To enhance the accuracy of this incremental alteration of exposure lighting, the knob 40 is returned to a "home" or zeroing position and then advanced to each of the successive incremental positions. This accommodates for any "play" or the like in the mechanical manipulation of the rheostat and is used, in particular, where no voltmeter is provided. With the pseudo target in place, as each of these voltage increments is reached, the output from window 22 of the exposure meter 20 is recorded. In effect, the voltage range represents the light output range of the work station 10. From the data thus developed, a characteristic curve may be plotted representing the unique performance of the camera/workstation 10 at hand. Each workstation will have a characteristic curve developed in this manner. The curve may be charted as represented by dashed line 56 and block 58. A darker, "brown card" or pseudo target may be used as a supplement to the standard "beige" pseudo background or target when material is encountered which is so dark as to require higher settings than the camera's light meter can show when "viewing" the beige colored pseudo target. In this case, a special characteristic curve is derived utilizing an extended voltage regulator range and a "brown" pseudo target or background. The resultant light meter settings will be lowered by the lesser reflectance of the "brown" pseudo target, thus allowing a supplemental filming chart to be created from the original test data by relating it to the "new" curve". No additional test filming is required. This supplemental procedure is in keeping with the goal of making the filming of many types of projects possible with a single series of "set-up" film tests.

Figure 3:
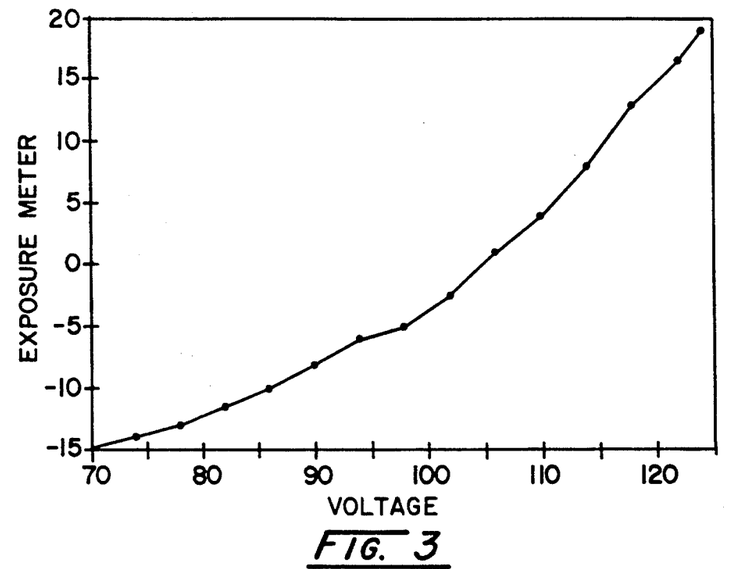
FIG. 3 is a characteristic curve developed in conjunction with the process of the invention.

Turning momentarily to FIG. 3, an exemplary characteristic curve taken for a camera station as at 10 is revealed. Note that the curve is plotted by incrementing the lamp voltage from 70 volts to 124 volts in 4 volt increments. The output of the exposure meter 20 is read to provide the second input generating the curve. Arbitrary values of the exposure meter 22 are seen to extend from a value of −15 to a value of +20. This characteristic relationship will be seen to permit subsequent filming to take place with a subjective evaluation of exposure parameter utilizing the conventional light meter 20.

Returning to FIG. 2, as represented at line 60, the procedure then carries out a film test with respect to the same incrementally varying exposure parameter, here the value of light as adjusted by rheostat 40 in conjunction with voltmeter 42. The same increments developing the characteristic curve of FIG. 3 are utilized. However, the pseudo background target or beige card now has been removed and is replaced with an assemblage of a plurality of discrete planar test regions, each region exhibiting a predetermined different hue within a given spectral region. For example, typically, the assemblage will be for the purpose of evaluating what may be termed "regular fade", i.e. in the beige or yellow region of spectral interest. On the other hand, the domineering fade for this assemblage may be in the blue region or in the red region representing respectively "blue fade" or "red fade". Generally, the assemblage will be in the form of a card which carries squares of discrete and different hue within a given fade election, for example beige or regularly encountered tints. These discrete regions will resemble, for example, the paint sample strips found in conventional retail paint stores. Enough of the samples are required to give a good chromanance or reflectance range, for example, 10 samples for each of these assemblages. In practice, the assemblage is called a "sample card". As represented at block 62, a film test is carried out utilizing film within camera 16 and placing the sample card at the filming position. Filming then takes place with the same sequence of exposure parameter values, i.e. voltages illuminating the banks of paired lights 32 and 34. The same voltages as were used to develop the characteristic curve as represented at block 58 are employed. Again, the knob 40 controlling the rheostat is manipulated to provide 4 volt increments across the range of available lighting at the light banks at 32 and 34. In addition to this test filming procedure, as represented at dashed line 64 and block 66, the sample card itself is analyzed using a reflectance densitometer. In this regard, each of the small samples on the card is evaluated with the reflectance densitometer and the results of that reading are written down on a setup sheet. A reflectance densitometer, in general, is an optical densitometer which measures a reflectance factor. The reflectance factor, R, is a measure of the amount of light which is reflected from a sample's surface. It is defined as the ratio of measured reflected flux from the specimen to the measured reflected flux from a perfect-reflecting, perfect diffusing material located inplace of the sample. Standards for measuring reflectivity are set out in ANSI/ISO 5/4-1983, ANSI PH2.17-1985. In practice, the reflectance factor is measured by shining light onto the sample's surface at an angle of approximately 45° and measuring the intensity of light reflected perpendicularly to the surface (ANSI standards specify the exact geometry).

Figure 4:
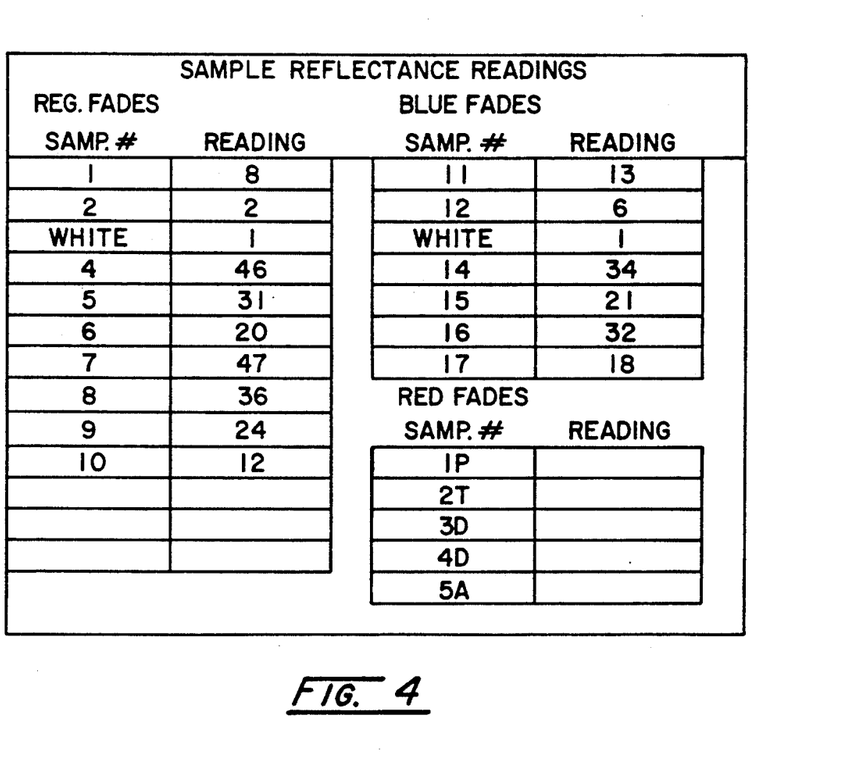
FIG. 4 is a set-up sheet developed in conjunction with the process of the invention recording reflecting densitometer readings taken in conjunction with a sample card.

Referring to FIG. 4, a typical setup sheet recordation is represented. This recordation was carried out with the same camera and process as employed in developing the characteristic curve of FIG. 3. The sample color card utilized in developing the data represented in FIG. 4 contain 10 randomly arranged sample color squares ranging from white to brown, representing in roughly uniform increments the range of colors encountered in the background of material to be filmed. The term "regular fades" is used in the figure to indicate conventionally encountered sepia variations in older paper. Different color families are required if the subject materials are present as print on paper of distinctly chromatic colors, i.e. a blue paper or a red background material. The data so developed provide an input to the process for correlating reflectance densitometer readings taken by the operator upon the background, non-print carrying portions of material to be filmed.

Returning to block 62, following the filming of the sample card positioned at the filming position, as represented at line 68 and block 70, the film is processed. Then, as represented at line 72 and block 74, the test film is evaluated utilizing a transmittance densitometer. In this regard, each of the color samples or squares on the sample card as revealed in image form upon the film, is evaluated in terms of density by the transmittance densitometer. The resultant readings from this transmittance densitometer are recorded.

In the course of carrying out this transmittance densitometric evaluation, the operator will beware of a target density mandated by the specifications at hand, for example, the RLG requirements. Thus, data which are entirely out of the realm of practicality can be discarded by the practiced operator. For the example now being developed as described in conjunction with FIGS. 3 and 4, a target density of 1.05, changed for simplicity to 105, is employed. Looking to FIG. 5, the example is continued with a film evaluation chart showing the measurement of the density of the test film for each sample color at each voltage setting or light value utilized in conjunction with the generation of the characteristic curve of FIG. 3. These voltage values are seen recorded across the top of the chart adjacent the term "volts". The sample numbers from the sample card are identified vertically along the chart and, for each sample color, the operator has selected the pair of voltage values representing the light exposure parameters which most closely bracket the desired or target density, here 105. It may be observed in the chart of FIG. 5 that for sample No. 1 of the regular fade card, a sample transmittance density 102 is achieved at a voltage or light setting of 98 and, bracketing the target value 105, the next voltage or light setting of 102 volts provides a transmission density of 123. The same form of bracketing may be observed for each of the ten sample color squares of the sample card. In a preferred embodiment of the procedure, software is utilized at this juncture for the purpose of carrying out a linear interpolation of the bracketed voltage values to determine an optimal voltage achieving target density for that particular square of the color card. Referring to Table I below, the value seen in FIG. 5 including bracketed density values and corresponding voltages are observed to be printed in spreadsheet fashion. In the table, the sample numbers are identified and low reading correspondingly, the (LoRead) and high reading (HiRead) values are then listed. In correspondence with those listings, then the low volt bracketing voltage (LoVolt) and the high voltage value for bracketing (HiVolt) are recorded. The differential or $\Delta$ value between the low reading and high reading then is computed and displayed under a color? read step (ReadStp) columnar heading. Note in this regard, that the difference between the readings 102 and 123 for sample 1 amount to the value, 21. In similar fashion, the difference between the bracketed voltages is computed and recorded under a column identified as voltage step (VoltStp). Note in this regard, that the difference between the low voltage of 98 and the high voltage of 102 for Sample 1 is recorded as the value, 4. Next, the table shows the target density (TargDens) which, as noted above, for the present example, is a value of 105. Using linear interpolation, i.e. conventional ratioing, an optimum voltage then can be computed. For Sample 1, that optimum voltage (OptVolt) is 98.57143.

Returning to FIG. 2, this procedure is represented by line 76 and block 78. As represented by line 80 and block 82, the procedure now refers to the optimum voltages as computed in connection with Table I and the sample density as carried out by the operator in conjunction with a reflectance densitometer and discussed in conjunction with block 26, and evolves from that an extrapolated relationship of reflectance densitometer reading range versus a calculated voltage for the lighting based exposure parameter. The application of sample card reflectance densitometer data to this function at block 82 is represented in FIG. 2 at dashed line 84. Generally, a range for the reflectance densitometer of 1–45 is elected, being a range suitable for most archival microfilming operations. However, broader ranges can be developed. A conventional regression analysis is carried out for this purpose developing a regression curve which provides a calculated voltage for each possible reading of the reflectance densitometer. Looking to Table II below, the value of reflectance densitometer (RefDens 1, 2, 3) is set forth in conjunction with the regression analysis calculated voltages (CalcVolt1, 2, 3). At this juncture of the procedure, it may be observed that the reflectance densitometer values are incrementally arranged integers which are readily found by the operator at the workstation 10. For example, the background of any given material or worksheet can be evaluated with the reflectance densitometer to obtain an integer reading. Then, the procedure at this point knows the precise calculated voltage to achieve the proper exposure control for that background.

TABLE II

| Calculated Voltage for Reflectance to Achieve Target Density | | | | | |
|---|---|---|---|---|---|
| Ref Dens 1 | Calc Volt 1 | Ref Dens 2 | Calc Volt 2 | Ref Dens 3 | Calc Volt 3 |
| 1 | 94.66626 | 16 | 102.709 | 31 | 111.4351 |
| 2 | 94.18229 | 17 | 103.2689 | 32 | 112.0425 |
| 3 | 95.70112 | 18 | 103.8318 | 33 | 112.6533 |
| 4 | 96.22278 | 19 | 104.3978 | 34 | 113.2673 |
| 5 | 96.74729 | 20 | 104.9669 | 35 | 113.8848 |
| 6 | 97.27466 | 21 | 105.539 | 36 | 114.5055 |
| 7 | 97.8049 | 22 | 106.1143 | 37 | 115.1297 |
| 8 | 98.33803 | 23 | 106.6927 | 38 | 115.7573 |
| 9 | 98.87406 | 24 | 107.2743 | 39 | 116.3883 |
| 10 | 99.41302 | 25 | 107.8591 | 40 | 117.0227 |
| 11 | 99.95492 | 26 | 108.447 | 41 | 117.6606 |
| 12 | 100.4998 | 27 | 109.0381 | 42 | 118.3019 |
| 13 | 101.0476 | 28 | 109.6325 | 43 | 118.9468 |
| 14 | 101.5984 | 29 | 110.2301 | 44 | 119.5952 |
| 15 | 102.1522 | 30 | 100.831 | 45 | 120.2471 |

However, it is an accurately calculated voltage generated initially from the characteristic evaluation of the work station 10. When filming the sample card assem-

TABLE I

| | Reflectance to Density by Voltage | | | | | | | | | | |
|---|---|---|---|---|---|---|---|---|---|---|---|
| Samp Nos | Lo Read | Hi Read | Lo Volt | Hi Volt | Read Stp | Volt Stp | Targ Dens | Opt Volt | Samp Dens | 1st Growth | LOGEST |
| Samp 1 | 102 | 123 | 98 | 102 | 21 | 4 | 105 | 98.57143 | 8 | 98.33083 | 1.005451 94.15304 |
| Samp 2 | 101 | 122 | 94 | 98 | 21 | 4 | 105 | 94.6719 | 2 | 95.18229 | |
| Samp 3 | 102 | 123 | 94 | 98 | 21 | 4 | 105 | 94.57143 | 1 | 94.66626 | |
| Samp 4 | 92 | 111 | 118 | 122 | 19 | 4 | 105 | 120.7368 | 46 | 120.9025 | |
| Samp 5 | 98 | 117 | 110 | 114 | 19 | 4 | 105 | 111.4737 | 31 | 111.4351 | |
| Samp 6 | 96 | 116 | 102 | 106 | 20 | 4 | 105 | 103.8 | 21 | 195.539 | |
| Samp 7 | 93 | 112 | 118 | 122 | 19 | 4 | 105 | 120.5263 | 47 | 121.5616 | |
| Samp 8 | 101 | 120 | 114 | 118 | 19 | 4 | 105 | 114.8421 | 36 | 114.5055 | |
| Samp 9 | 102 | 119 | 110 | 114 | 17 | 4 | 105 | 110.7059 | 24 | 107.2743 | |
| Samp 10 | 93 | 112 | 98 | 102 | 19 | 4 | 105 | 100.5263 | 13 | 101.0476 | | blage, it is desirable to extend the range of voltages, i.e. as demonstrated from 70 v through 140 v at the same increments used to determine the characteristic curve as earlier noted. This allows accurate calculation of optimum voltages for sample squares which may be too dark to obtain the desired target density as described in connection with block 74 of FIG. 2. The additional data points at the high end provide for a more accurate regression analysis as discussed in connection with block 82 in FIG. 2 and are useful as reference points should the addition of a "brown card" as earlier discussed become desirable.

Figure 6:
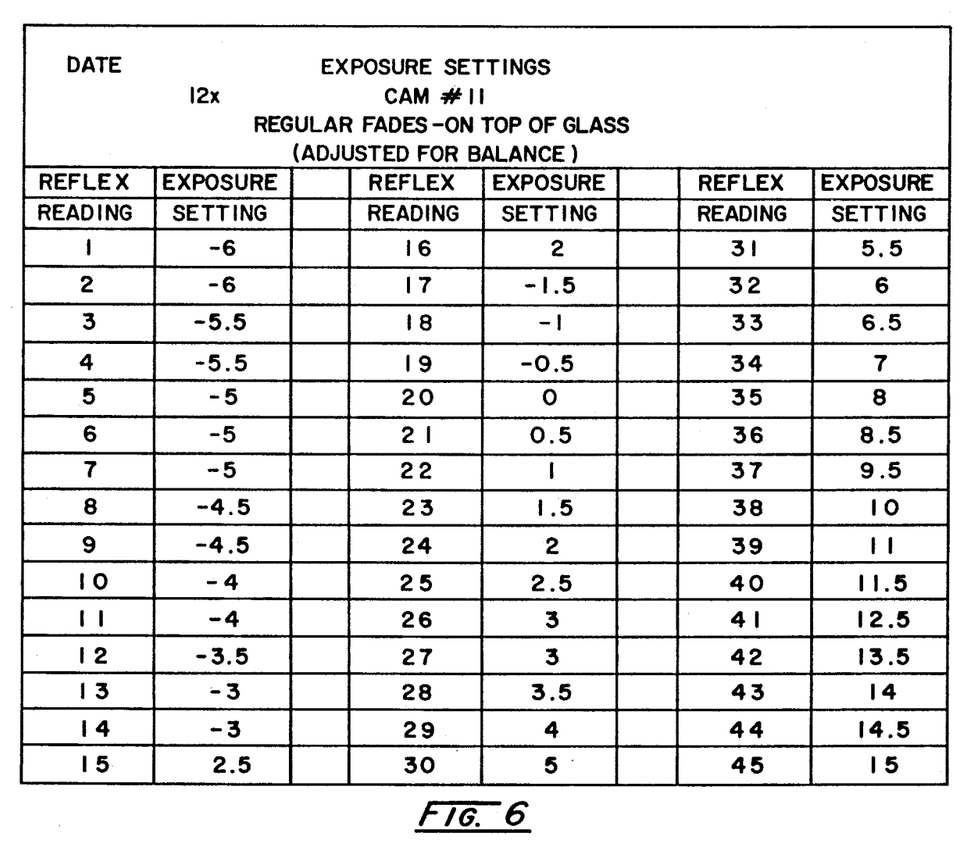
FIG. 6 is a filming chart employed with the process of the invention.

The process now returns to the characteristic curve represented at block 58 in FIG. 2 and exemplified in FIG. 3 to provide for the setting of exposure parameter, i.e. light value based upon the reflex densitometer reading (reflex reading) and carried out through the manipulation of knob 40 to control the luminal output of lights 32 and 34 until a proper exposure setting is read from the exposure meter 20. However, to assure a consistency established at the outset, the pseudo background target is used to set lighting with the exposure meter 20. The operator removes the pseudo target or beige card following setting of lighting and then carries out filming in a conventional manner. As represented by line 86, block 88, and dashed line 90, a filming chart is developed for each unique workstation 10 which gives the operator proper exposure meter 20 settings for any given background reflex densitometer reading. Looking to FIG. 6, such a filming chart for the exemplary procedure described is presented.

With the procedure at hand, the operator need not rely upon a purely subjective or sight evaluation of the work under way. Where the operator perceives that some change requiring an evaluation is occurring in the tonal reflectance based background of the material being filmed, then an objective evaluation can be carried out wherein a reflectance densitometer is used on a background portion (a portion having no printed characters) of the subject material to derive an integer output which is then employed in conjunction with the filming chart of FIG. 6 to, if necessary, adjust the lighting from flood lamps 32 and 34 to a new luminal value as established by the pseudo target and exposure meter 20. This procedure can be carried out when determined necessary by the operator, and/or on a recurring periodic basis.

Figure 5:
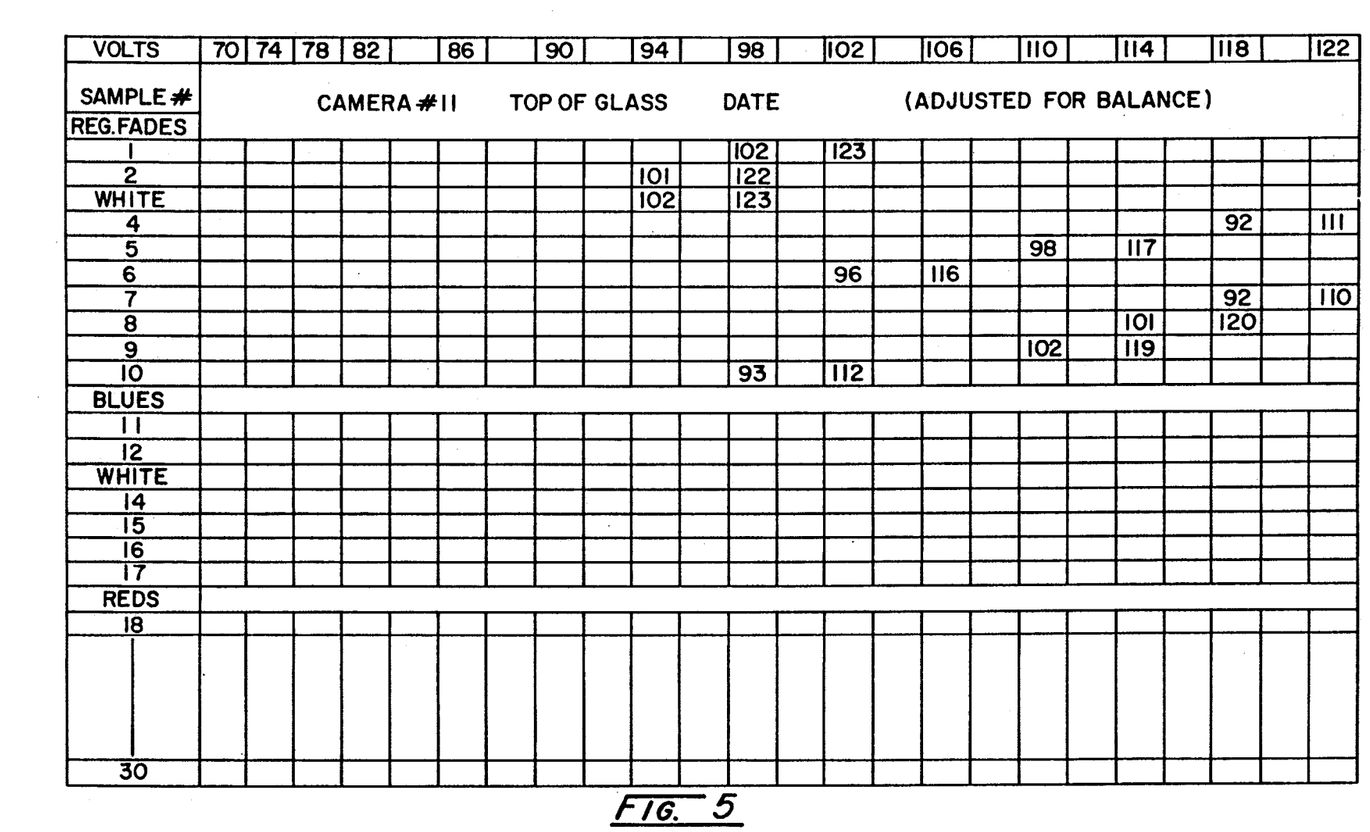
FIG. 5 is a film evaluation chart employed in conjunction with the process of the invention.
Figure 7:
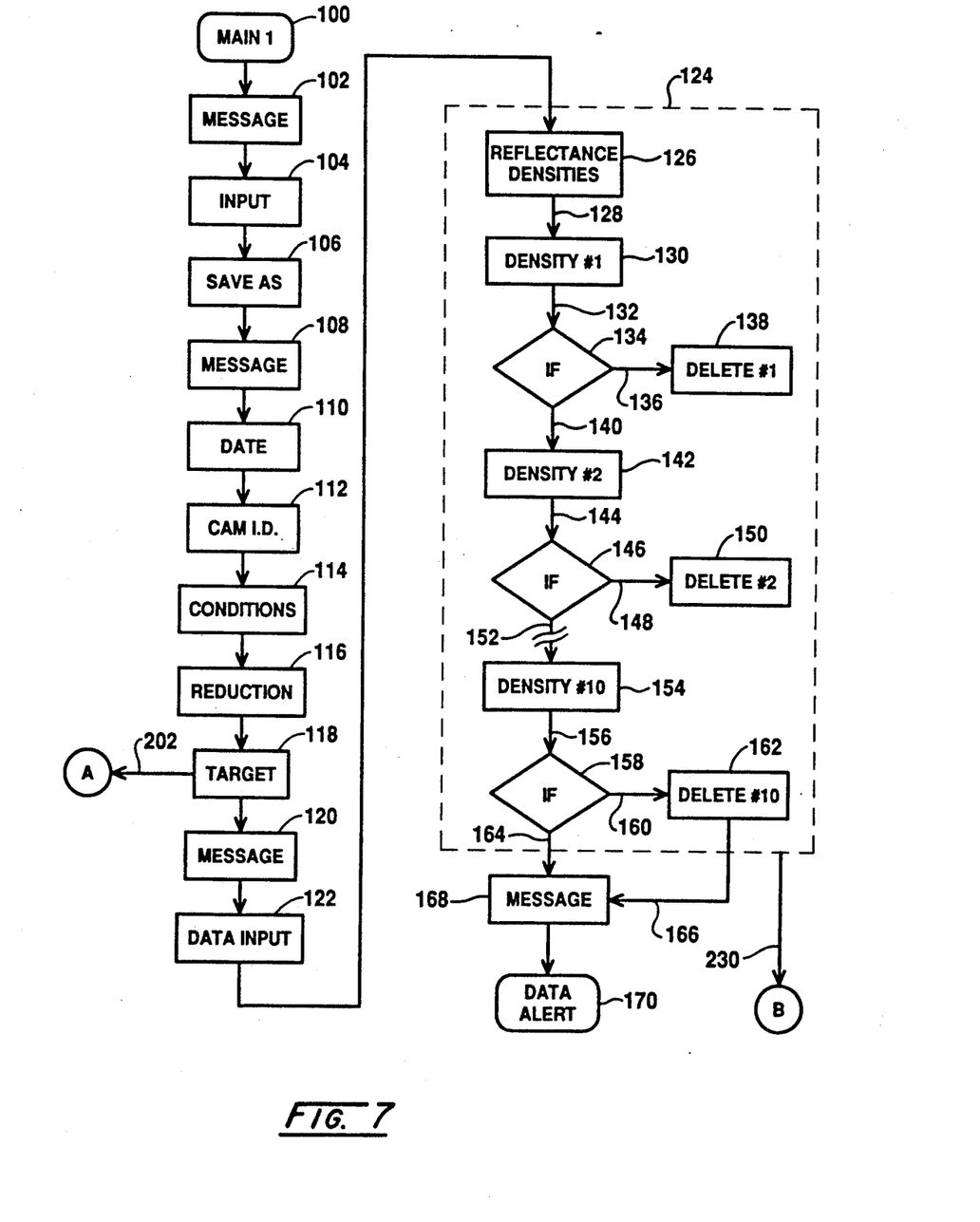
FIG. 7 is a block diagrammatic flow chart showing a program employed in conjunction with the process of the invention.

Looking to FIG. 7, a program from which the worksheet or spreadsheet data represented in Tables I and II may be derived is described in flow chart fashion. In general, such program preferably is "user friendly" prompting the operator from step-to-step through the process of developing the exposure chart of FIG. 6. The program opens with an initial node identified as "Main 1" as represented at block 100. Then, as represented at block 102, a message is provided to the operator commencing the "user friendly" aspect of the procedure. This message will advise that a series of inputs will be called for including an inquiry as to what file name to save the data in, the date, the camera identification, and filming conditions. Preferably, information collection is carried out utilizing dialogue boxes and its commencement is represented at block 104 as "Input". The file name for saving the data of this particular run is entered as represented at "save as" block 106 and, generally, another message is provided to prompt the operator as represented at block 108. Then, as represented at block 110, the date that this procedure was carried out is entered and, as represented at block 112, camera identification is inserted. Next, film conditions are entered as represented at block 114. These conditions will look to whether a regular, blue or red fade is involved along with filming position such as the noted top of glass or under glass form of filming is to be utilized. It should be pointed out, however, that more than one color card or fade sequence will be employed to enhance the flexibility of the camera for any given set-up procedure. Thus, for example, the regular and blue fade sample cards are utilized in the above-described example as represented at FIG. 4. By including these data, the installation 10, once set-up, can be used for a multitude of different projects or "jobs". Different chromatic "families" such as "red" or "blue" should be run through the program as separate data sets. The regression portion of the program acts on the data as a "range" and the end result is a chart for that range. Thus, separate charts are made for "red" or "blue" material. The original filming of the sample assemblages can be done all at once, even on the same sample card but the data for each "family" must be evaluated and processed separately. The same consideration holds for filming conditions which may be encountered. In this regard, the assemblage containing the samples represented by reflectance readings as described in connection with FIG. 4 might be test filmed in the "under glass" position and then in the "top of glass" position. There would then be two evaluation sheets as represented in FIG. 5; one for the "under glass" position and another for the "top of glass" position, each containing data for both "regular fades" and "blues fades". The progran described in conjunction with FIG. 7 can then be run four times, resulting in four filming charts which may be designated as:

regular fades—under glass
blue fades—under glass
regular fades—top of glass
blue fades—top of glass These charts are kept at the camera station and, depending upon the job or project, the appropriate chart is used for filming. The reduction at hand is entered as represented at block 116. Typically, reduction is at a 12:1 ratio. Where changes in reduction are made, involving the vertical maneuvering of camera 16 on column 18 (FIG. 1), the adjustments in exposure setting are called for. In a preferred arrangement, the actual testing is carried out at a 12:1 reduction and where a different reduction ratio is called for, then extrapolation by percentage is carriedd out . The target density then is entered as represented at block 118. In the exemplary procedure above, it may be recalled that a target density of 1.05 was utilized but altered, for convenience, to the value "105".

The program now will provide a message as represented at block 120 to carry out a data input as represented in general at block 122. This data input is represented within the dashed boundary 124 and looks, as represented at block 126, to the reflectance densities of the sample card or assemblage of discrete planar test regions. The inputting of these values, as have been recorded on the sample reflectance chart as shown in FIG. 4, may represent what are, in effect, unusable readings. In this regard, occasionally, some of the samples on the sample reflectance card are so dark that a camera with insufficient spectral range will not be able to achieve a usable exposure. Thus, the operator is called upon to delete sample information which would be invalid. This is the procedure carried out within the dashed boundary 124. For example, as represented at line 128 and block 130, the reflectance density of sample No. 1 is evaluated. As represented at line 132 and block 134, if the reading is usable, then, as represented at line 136 and block 138, the data representative of sample No. 1 is deleted. In similar fashion, as represented at line 140 and block 142, the reflectance densitometer output value for sample No. 2 is accessed and evaluated. This evaluation is represented at line 144 and block 146. Where the reflectance density reading is unusable, then as represented at line 148 and block 150, the data associated with sample No. 2 of the card are deleted. This procedure continues through all samples, for example through sample No. 10 of a card having 10 sample regions as represented by broken line 152 leading to the accessing of the reflectance density for sample No. 10 as represented at block 154. Evaluation of this density value is represented by line 156 and block 158. Where the density is unusable, then as represented by line 160 and block 162, it is deleted. Otherwise, the information is entered as represented at line 164 or alternately as represented at line 166. At this juncture, the program provides a message to the operator as represented at block 168 which prompts a reference to the exposure test result sheet or film evaluation chart described in connection with FIG. 5. The program then proceeds to carry out a data input as represented by node 170 labeled "Data Alert".

Figure 8:
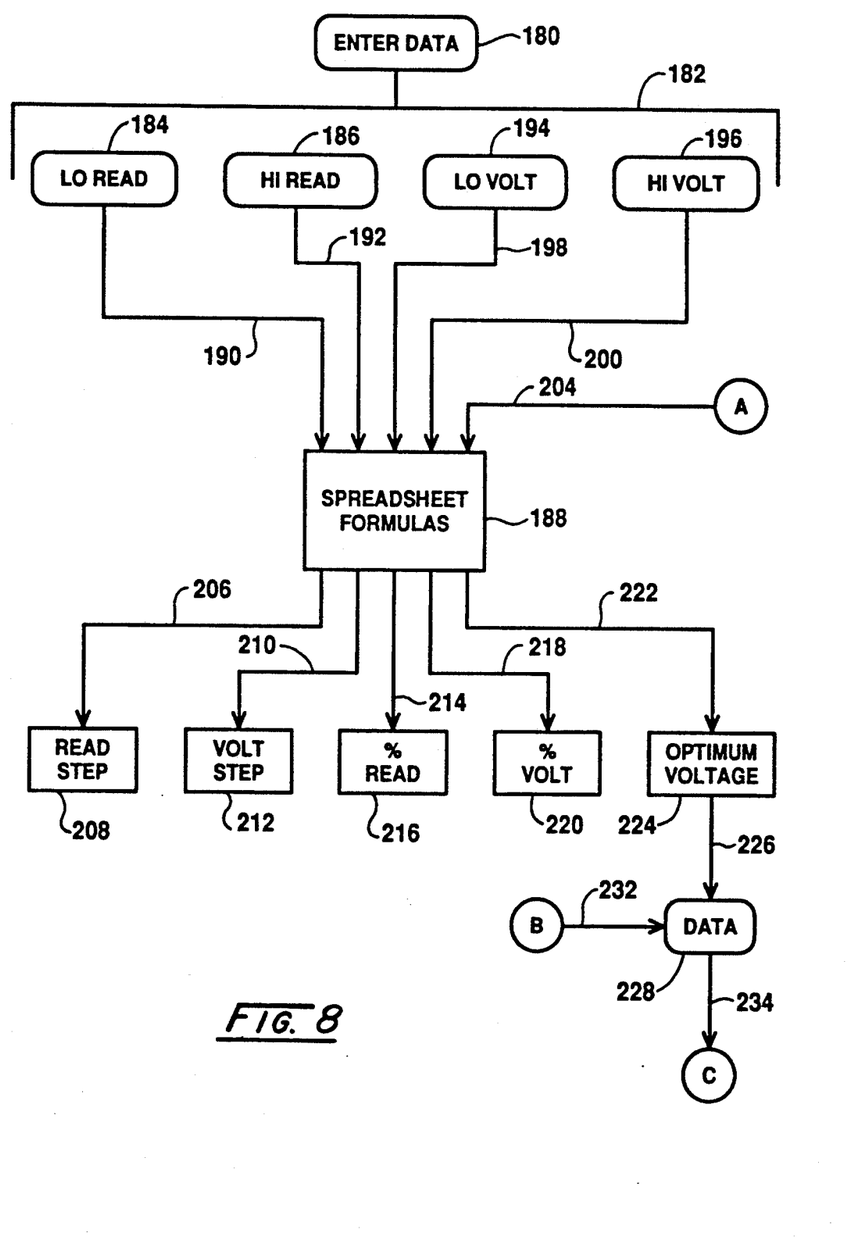
FIG. 8 is a flow chart representing a component of the block diagrammatic representation of FIG. 7.

Looking to FIG. 8, the entry of the data from the film evaluation chart and resultant operation upon those data are represented by node 180 showing an Enter Data node in conjunction with the bracket 182. As these data are entered, the spreadsheet entries represented in Table I above are generated by the program. Thus, referring again to FIG. 5, for each sample of the sample card, the bracketing transmission densitometer readings are entered in conjunction with the voltage values from which they were generated. As shown at nodes 184 and 186, bracketing data will include a low transmission density reading and a high transmission density reading, the values of which are submitted to spreadsheet computation utilizing spreadsheet formulas as represented at block 188. These inputs from nodes 184 and 186 are represented by respective lines 190 and 192. The corresponding low voltage and high voltage readings for those bracketed transmittance densities are entered as represented by nodes 194 and 196. Those voltage readings, then are submitted, as represented respectively by lines 198 and 200 to treatment by the spreadsheet formulas as represented as block 188.

Additionally provided for the computation at hand is the target density. Provision of this information is represented as emanating from block 118 in FIG. 7 at line 202 extending to node A. Node A reappears in FIG. 8 and is seen extending via line 204 to block 188.

The computations carried out to develop the spreadsheet represented by Table 1 above, will provide the sample number column along with the reading step valuation shown in Table I under the designation: "ReadStp" as represented herein at line 206 and block 208. Similarly, the computed voltage step is developed as represented at line 210 and block 212. As noted earlier, a linear interpolation is utilized to compute optimum voltage from the above data. In this regard, a ratioing percentage for the transmission reflectance reading and the corresponding voltage is developed as represented by line 214 and block 216 as well as line 218 and block 220. Then, as represented at line 222 and block 224, optimum voltage, the precise voltage needed to achieve target density is computed and listed in the spreadsheet of Table I (OptVolt).

As represented at line 226 and data node 228, the data so far evolved are compiled. These data will include the information as to reflectance densitometry measurement upon the sample card samples as developed in conjunction with FIG. 7 within dashed boundary 124. The data so compiled therein, are represented as being directed via line 230 to a node B. Node B reappears in FIG. 8, and the data represented thereby are shown directed to the compilation function node 228 via line 232. The data flow then is represented at line 234 extending to node C.

Figure 9:
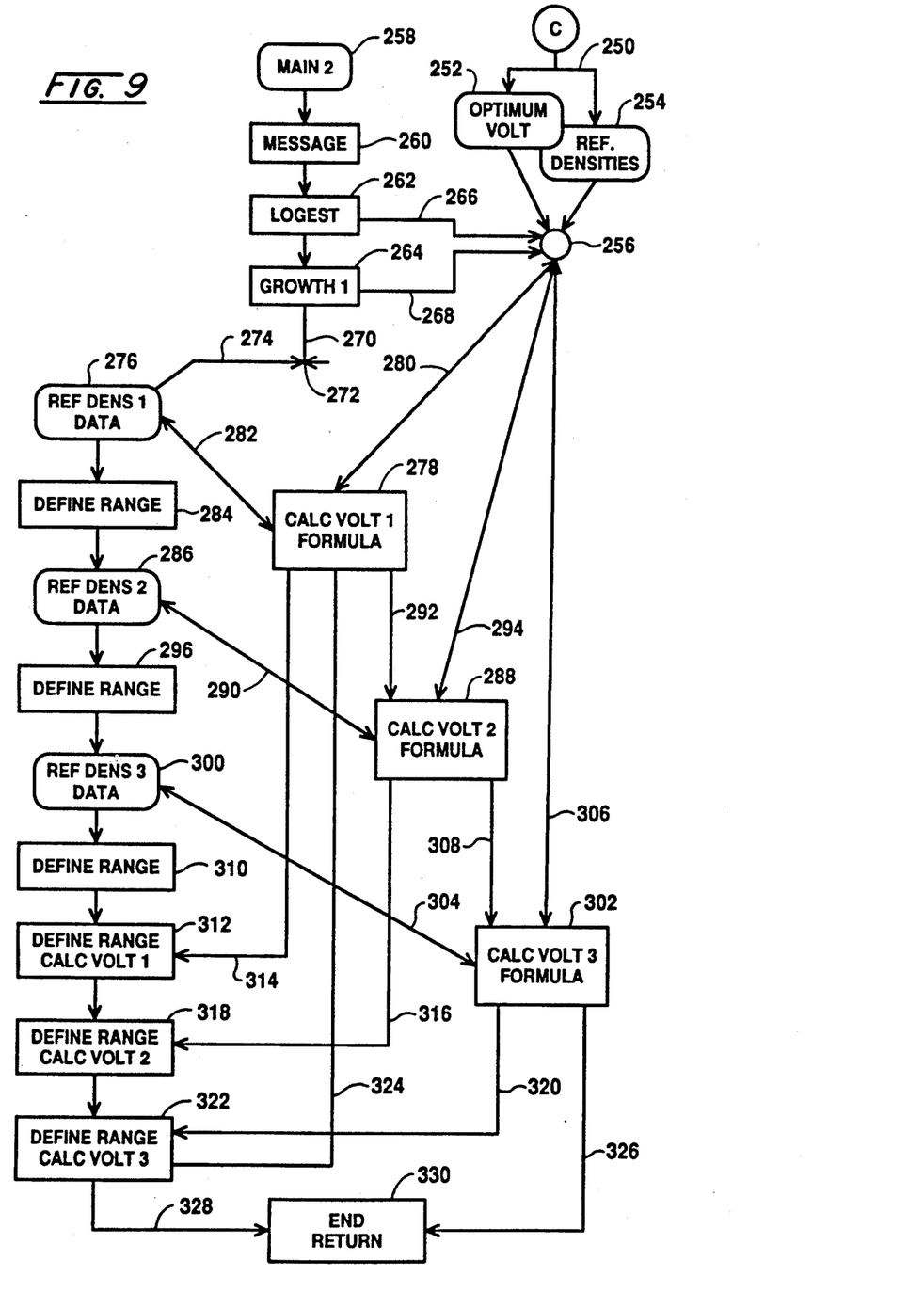
FIG. 9 is a flow chart showing a second component of a program employed with the process of the invention.

Turning to FIG. 9, node C reappears and is seen, as represented by line 250, to be directing the above information now represented by labels 252 and 254 to a collection node 256. Thus, computed optimum voltages for each of the sample numbers of the sample card are inserted along with the densities read out in conjunction therewith. These data are employed in conjunction with a second main component of the data treatment program. This second component is represented as being entered into at node 258 and then progresses to a prompting message as represented at block 260. Then, as represented at blocks 262 and 264 an extrapolation procedure, as discussed generally at block 82 in FIG. 2 commences wherein data representing a slope, itemized under the label "LOGEST" in Table I are developed. LOGEST is a proprietary software function marketed as Microsoft Excel, Version 3.0, which functions to calculate an exponential curve that fits data and returns an array that describes the curve. Those data are submitted to the general compiling node 256 as represented at line 266. A first growth regression operation as represented at block 264 also is carried out. Identified by the label "GROWTH", this activity is carried out using proprietary software by that trade designation marketed as above by Microsoft Corporation. For each of the programs above, the range heading "OptVolt" may be substituted for the argument definition of the program referred to as "known_y's" "sampDens" for "known_x's"; and "refDens1(2)(3)" for "new_x's". This first growth information is listed within the spreadsheet Table I for the purpose of providing the operator with information as to the validity of the data. Where the readings are obviously erroneous, they can be accommodated for the operator at this point. In general, as noted earlier, an exponential regression curve is calculated that describes the data. Figures which represent the noted slope as well as y-axis intercept of the curve that best fits the values of the data series are collected. These then can be applied as the formula $y=b*mx$, where m is slope and b is the y-axis intercept are the constants to a range of possible reflectance values. Three ranges are defined in the procedure to follow. For example, as represented in 15 integer lengths at Table III, three of which are accumulated for values 1 through 45. Note that data now will be supplied as represented by line 270 and dual arrow symbol 272 to evolve the calculated voltage for reflectance to achieve target density as shown in Table II. The data input for a first range is represented at line 274 to Reference Density 1 data at node 276. These data are then interactive with a first range formula calculation as represented at block 278 which performs in conjunction with data from the node 256 as represented at 280 and interactively as represented at line 282. A range then is defined as represented at block 284. This procedure generally is reiterated for the three ranges at hand. In this regard, reference density 2 data are collected and evaluated as represented at node 286, which information is interactively, associated with calculations for a voltage 2 or second range formula represented at block 288 by interactive line 290. Also incorporated in the computations are the information from block 278, as represented at line 290 and the general data supply from node 256, as represented by line 294. A second range then is defined as represented at block 296 an Reference Density 3 Data are accumulated as represented at node 300. Node 300 performs interactively with the voltage 3 calculation and formula as represented at block 302 and line 304. That calculation also utilizes the general data collection from node 256 as represented at line 306 and the information involved in conjunction with computations represented at block 288 as shown at line 308. A third range then is defined as represented at block 310 and, with the information thus provided, the calculated voltages for range 1 are generated from block 278 as represented at block 312 and line 314; the calculated voltages for range 2 are evolved as represented by block 288, line 316, and block 318; and the calculated voltages for reflectance density range 3 are calculated as represented at block 302, line 320, and block 322. The latter range definition also is seen to require input from the formulation at block 278 as represented by line 324. With the above data compilation and computation of the subject matter of Table II completed, then as represented at lines 326, 328, and line 330, the program returns and ends.

Since certain changes may be made in the above described method without departing from the scope of the invention herein involved, it is intended that all matter contained in the description thereof or shown in the accompanying drawings shall be interpreted as illustrative and not in a limiting sense.

I claim:

1. A process for recording the image on film of a sheet carrying characters on a background exhibiting a given hue, said process employing a camera arrangement having a filming position at which said sheet is located for filming, an exposure meter having an output corresponding with light reflectance at said filming position, and at least one variable exposure control parameter including light from a light source directing spectral illumination output at said filming position, comprising the steps of:

providing a pseudo background target having a select uniform hue;

positioning said pseudo background target at said filming position and varying said illumination output by a predetermined sequence of light values;

simultaneously deriving said exposure meter output for each one of said light values and providing a characteristic relationship of each said derived meter output with said light values;

removing said pseudo background target from said filming position;

providing a test assemblage of a plurality of discrete test regions, each exhibiting a predetermined different hue;

determining a reflectance value for each said discrete planar test region;

positioning said assemblage at said filming position;

filming said assemblage with a test sequence of exposures corresponding with said predetermined sequence of light values to derive test film carrying a sequence of images of said assemblage;

deriving the density values of each image of said test regions on said test film;

correlating said density values with respect to a target density value, said predetermined sequence of light values and said determined reflectance values to derive a calculated light value corresponding with each one of a predetermined regular sequence of reflectance values;

deriving an exposure setting compilation as said exposure meter output for each said reflection value of said predetermined regular sequence thereof from said characteristic relationship;

determining the reflectance value of said sheet background; and photographing said sheet employing a said exposure control parameter representing an exposure setting of said compilation substantially corresponding with said determined reflectance value of said sheet background.

2. The process of claim 1 in which said uniform hue of said pseudo background target is selected substantially from within a predetermined fade designated, primary color region of the visible spectrum.

3. The process of claim 2 in which said fade designated primary color region of the visible spectrum is selected from yellow, red, and blue regions.

4. The process of claim 1 wherein said test regions of said test assemblage are planar and are provided as different hues selected substantially from within a predetermined primary color region of the visible spectrum.

5. The process of claim 4 in which said primary color region of th visible spectrum is selected from yellow, red, and blue regions.

6. The process of claim 1 in which said step of photographing said sheet includes the steps of:

accessing said exposure setting compilation to locate a said reflection value corresponding with said determined reflectance value of said sheet background and the said exposure meter output associated therewith;

adjusting said light source illumination output to a select level wherein said exposure meter output substantially equals said accessed exposure meter output; and photographing said sheet at said select level of illumination output.

7. The process of claim 6 including the step of locating said pseudo background target at said filming position while carrying out said adjustment of said light source.

8. The process of claim 1 wherein said step for deriving the density values of each image of said test regions includes the steps of:

determining the pair of said density values next closest above and below said target density value for each discrete test region; and determining the optimum light value for said target density from said pair of density values.

9. The process of claim 8 wherein said determination of said optimum light value is by linear interpolation.

10. The process of claim 8 in which said step of correlating said density values with respect to said target density value is carried out in conjunction with said optimum light vaues as said predetermined sequence of light values employing regression analysis.

11. A process for recording the image on microfilm of a sheet carrying characters on a background region, said process employing a workstation including a camera, a filming position at which said sheet is located for filming and said camera being actuable in accordance with a controlled exposure parameter to effect generation of said image comprising the steps of:

providing a pseudo background target having a select uniform hue;

locating said pseudo background target at said filming position and deriving an exposure response characteristic sequence of values of a said exposure parameter;

providing a sample card carrying a plurality of a background samples of select, mutually different hue;

determining the reflection density value of each said background sample;

locating said sample card at said filming position;

producing test recordations of said sample card on microfilm with said camera using said sequence of values of said exposure parameter;

deriving transmission density values for the images of said background samples of said test recordations with respect to said sequence of values of said exposure parameter;

correlating said transmission density values with respect to a target density value, said sequence of values of exposure parameter and said determined reflectance density values to derive a calculated expousre parameter corresponding with each one of a predetermined regular sequence of reflectance density values;

determining the reflectance density value of said sheet background region; and photographically recording said sheet on microfilm with said camera at a value of exposure parameter from said characteristic sequence selected with respect to a said calculated exposure parameter corresponding with said determined reflectance value.

12. The process of claim 11 in which said step for deriving transmission density values for the images of said background samples includes the steps of:

determining the pair of said transmission density values next closest above and below said target density value for each of said sequence of values of said exposure parameter; and determining the optimum exposure parameter value for said target density from said pair of density values.

13. The process of claim 12 wherein said determination of said optimum exposure parameter values is by linear interpolation.

14. The process of claim 12 in which said step of correlating said transmission density values with respect to said target density value is carried out in conjunction with said optimum exposure parameter values as said predetermined sequence of values of exposure parameter employing regression analysis.

15. The process of claim 11 in which said background samples of said sample card are planar and are provided as hues selected substantially from within a predetermined primary color region of the visible spectrum.

16. A process for recording the image on microfilm of a sheet having a background region of given hue, said process employing a workstation including a camera, a filming position at which said sheet is located for photographing by said camera, an exposure meter having outputs corresponding to light values at said filming position, and a variable light source directing select illumination at said filming position in accordance with light input values, comprising the steps of:

providing a pseudo background target having a consistent hue selected in correspondence with said sheet background region of given hue;

locating said pseudo background target at said filming position and incrementally varying said light input values in a predetermined sequence;

simultaneously recording said exposure meter outputs for each one of said light input values and deriving a characteristic relationship of said recorded exposure meter outputs with said light input values;

removing said pseudo background target from said filming positon;

providing a sample card carrying a plurality of background samples of select, mutually difference hue;

determining the reflectance density value of each said background sample;

producing test recordations of said sample card on microfilm with said camera using said predetermined sequence of light input values as a variable exposure parameter;

deriving transmission density values of the images of said background samples of said test recordation with respect to said predetermined sequence of light input values;

correlating said transmission density values with respect to a target transmission density value, said sequence of light input values and said predetermined reflectance density values to derive a calculated light output value corresponding with each one of a predetermined regular sequence of reflection density values;

determining the reflectance density value of said sheet background region;

recording the image of said sheet on microfilm using a light output value derived with respect to said exposure meter output selected in correspondence with a said calculated light output value, said calculated light output value, in turn, corresponding with a said predetermined reflectance density value equivalent to said determined reflectance density value of said sheet background region.

17. The process of claim 16 in which said sample card background samples are provided as hues selected substantially from within a primary color region of the visible spectrum predetermined with respect to said given hue of said sheet.

18. The process of claim 16 in which said step of recording the image of said sheet on microfilm includes the steps of:

deriving an exposure setting compilation from said characteristic relationship as said exposure meter out put for each one of said predetermined regular sequence of reflection density values;

selecting an exposure meter output from said compilation corresponding with said determined reflectance density value of said sheet background region; and adjusting said light output to effect equivalence between said selected exposure meter output and the then present exposure meter output.

19. The process of claim 18 in which said step of adjusting said light output is carried out eith said pseudo background target located at said filming position.

* * * * *

UNITED STATES PATENT AND TRADEMARK OFFICE
CERTIFICATE OF CORRECTION

PATENT NO. : 5,146,267
DATED : September 8, 1992
INVENTOR(S) : Michael H. Riley

It is certified that error appears in the above—identified patent and that said Letters Patent is hereby corrected as shown below:

On the title page, item [73]:

The Assignee of record is printed "OCLC Online Computer Library Center, Incorporated, Dublin, Ohio" should read:

--MAPS, THE MICROGRAPHIC PRESERVATION SERVICE, INC., BETHLEHEM, PENNSYLVANIA --.

Signed and Sealed this

Eighth Day of February, 1994

Attest:

BRUCE LEHMAN

Attesting Officer

Commissioner of Patents and Trademarks